UNITED STATES PATENT OFFICE.

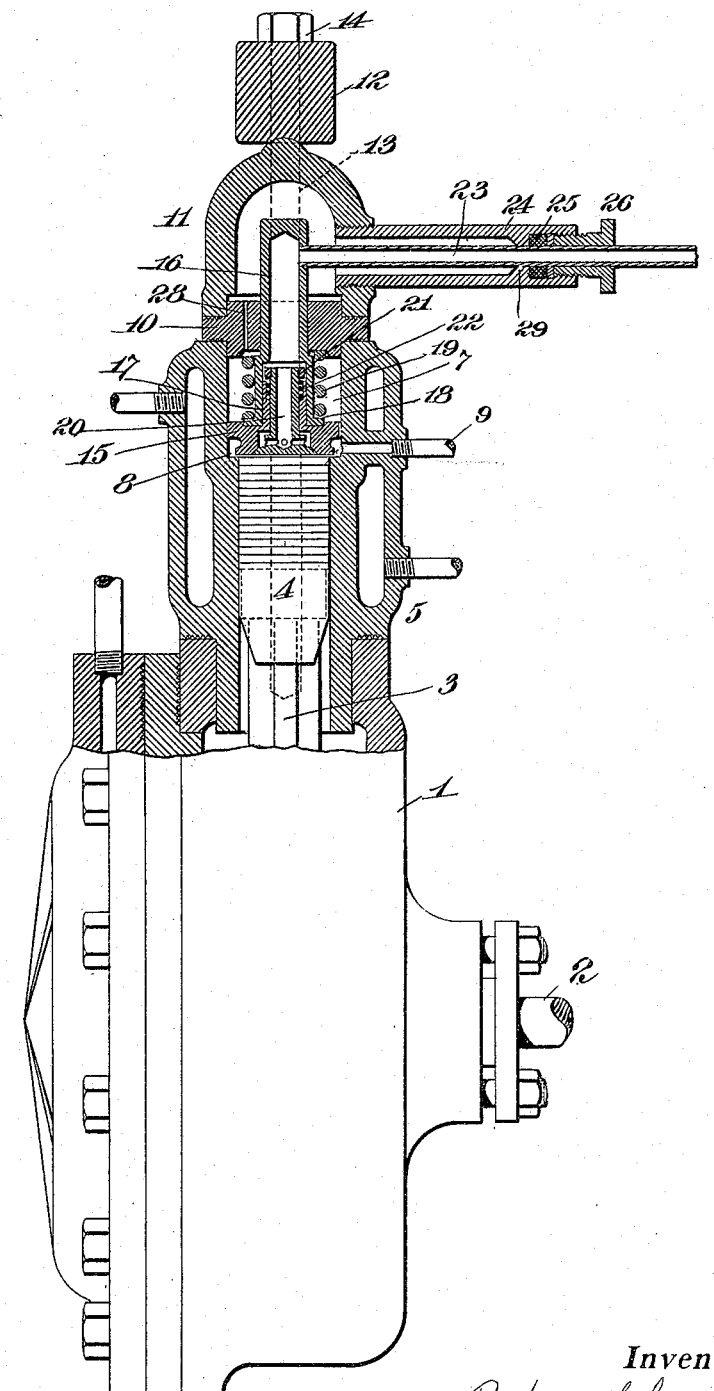

RICHARD WHITAKER, OF NEW BRUNSWICK, NEW JERSEY, ASSIGNOR TO THE BRUNSWICK REFRIGERATING COMPANY, A CORPORATION OF NEW JERSEY.

GAS-PUMP.

No. 899,585.      Specification of Letters Patent.      Patented Sept. 29, 1908.

Application filed March 7, 1907. Serial No. 361,025.

*To all whom it may concern:*

Be it known that I, RICHARD WHITAKER, a citizen of the United States of America, residing at New Brunswick, in the county of Middlesex, State of New Jersey, have invented an Improvement in Gas-Pumps, of which the following is a specification.

The object I have in view is to produce a gas pump which may be used for compressing gases, particularly ammonia gas, in refrigerating apparatus.

The particular object I have in view is to entirely avoid the use of a packed joint between moving surfaces, and increase the area of equilibrium surface.

The invention is particularly applicable to duplex valves in which the inlet valve is carried by the outlet valve.

The drawing illustrates a pump, partly in section, embodying my invention.

In the drawing, 1 represents the crank casing, in which the shaft 2 is mounted. Within the crank casing is the usual crank which is connected to the connecting rod 3. 4 is a piston and 5 is a cylinder. The cylinder is attached to the crank casing 1 in any manner, but preferably as shown in my copending application Serial No. 188,612. The cylinder has an enlargement 7 which constitutes part of the equilibrium chamber. The connection between the enlargement and the bore of the cylinder is in the nature of a shoulder 8 which constitutes a valve seat. A draw-off pipe 9 communicates with this valve seat so that the compressed gas can be taken off. At the upper end of the enlarged chamber 7 is a plate 10 which serves as a support for the valves. This plate 10 is clamped against the open end of the cylinder 5 by means of a casing 11. This casing is caused to engage with the plate 10 by a cross-bar 12 which is clamped to the casing 1 by bolts 13 set up with nuts 14. The joints between the casing 11 and plate 10 and between plate 10 and the top of the cylinder 5 and between the bottom of the cylinder 5 and the crank casing 1 are made with concentric sharp-faced grooves such as disclosed in my application Serial No. 188,612. These grooves prevent leakage and reduce the cost of construction. By removing the nuts 14 the cross-bar 12 may be lifted up, permitting the removal of the casing 11 and plate 10, thus disclosing the interior of the cylinder 5.

The duplex valve comprises an outlet valve 15 which has a stem or hollow spindle 16 which extends through the plate 10 and into the casing 11. This hollow spindle 16 may be made integral with the valve 15 but is preferably made separate as shown, the valve body having a hollow stem 17 which extends into an enlargement of the spindle 16, such spindle being made separate. The bottom of the spindle 16 is provided with a flange 18 against which the seating spring 19 engages. The other extremity of the seating spring engages with the plate 10.

The inlet valve is provided with a hollow stem 20, as shown. This stem is guided within the stem 17. A nut 21 upon the upper end of the stem 20 engages with a small spring 22 which rests within a small annular chamber formed on the inside of the stem 17. By adjusting the position of the nut 21 the tension upon the spring 22 may be controlled. The spring 22 is for the purpose of keeping the inlet valve seated. The center bore of the inlet valve communicates with horizontal passages which terminate adjacent to the bearing seat of the valve.

The stem 16 communicates with the conduit outside of the pump by means of a flexible pipe 23. This pipe 23 passes through a larger tube or pipe 24 which is a fixture on the side of the casing 11. The pipe 23 is best made of steel, so that it will flex sufficiently to permit opening and closing of the valves. The pipe also should be sufficiently long for this purpose. The end of this pipe 24 is provided with packing 25 and a gland 26. The pipe 23 extends outward where it can connect with a gas reservoir, so that gas may be drawn into the pump. The bore of the pipe 24 is reduced immediately adjacent to the packing 25 at 29, thus giving a bearing for the pipe 23. The gland 26 and packing 25 merely have to be set up tight and this can be done by any one not particularly skilled. If there be any leakage at this point, it can be prevented by simply setting up the packing a little tighter. If there be any leakage, it will all be on the outside, consequently there will be no danger of ammonia gas condensing within the equilibrium chamber and thereby interfering with the operation of the valves.

The operation is as follows: During the down-stroke of the piston, gas is drawn through the pipe 23 into the hollow bore of the spindle of the outlet valve and into the hollow stem of the inlet valve. The outlet valve remains seated by means of its spring and the inlet valve opens, permitting the gas to enter the cylinder. During the compression stroke, the inlet valve is closed and the gas will be compressed against the two valves. When the pressure within the cylinder exceeds the tension of the spring 19 the outlet valve will open, permitting the escape of the compressed gas into the pipe 9. There is no tight joint between the edges of the valve 15 and the enlarged chamber 7; on the contrary, the joint is sufficiently loose to permit the gas to pass into that chamber above the outlet valve. The joint or the bearing between the plate 10 and the spindle 16 is also a loose one, so that the gas can pass into the chamber 11. If desired, an additional channel 28 may be provided to permit this to be done. There will therefore be a nearly equilibrium of pressure within the chambers 7 and 11 as there is below the outlet valve and within the pipe 9. This equality of pressure will put the valves in partial equilibrium. The seating pressure will be as large as the unseating pressure minus the area of cross-section of the pipe 23. This pipe 23 may be made as small as desired. The seating pressure therefore may be made nearly as great as the unseating pressure. Hence the size of the spring 19 and its strength may be reduced within reasonable limits without unduly enlarging the chamber 7 to accommodate a large spring. As the outlet valve is lifted from its seat the tube 23 will be flexed to accommodate such movement. The movement of the outlet valve does not ordinarily exceed one one-hundredth of an inch. Consequently the tube 23 should be merely long enough to permit of flexing to this extent without danger of breaking and without exerting too much resistance to the movement of the valve.

It will be seen from this description that the valve avoids packed joints between the moving surfaces. The tube 23 with the gland and packing at the end do not offer the objections which are found where packing must be secured between a moving and a fixed member.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described the nature of my said invention and in what manner the same is to be performed, what I claim is:

1. A gas pump having at the end of its compression cylinder a valve seat, an equilibrium chamber, a plate across the outer end of said chamber and an outer chamber beyond said plate communicating with said equilibrium chamber, combined with an outlet valve adapted to said seat and having a hollow spindle extended through said plate, an inlet pipe connected with said hollow spindle within said outer chamber and thence extending through the wall of said chamber for connection with a source of gas supply, and an inlet valve carried by said outlet valve, said inlet pipe being capable of being flexed as the outlet valve opens.

2. A gas pump having at the end of its compression cylinder a valve seat, an equilibrium chamber, a plate across the outer end of said chamber and an outer chamber beyond said plate communicating with said equilibrium chamber, combined with an outlet valve adapted to said seat and having a hollow spindle extended through said plate and having a closed outer end, an inlet pipe connected with the side of said hollow spindle within said outer chamber and thence extending through the wall of said chamber for connection with a source of gas supply, and an inlet valve carried by said outlet valve, said inlet pipe being capable of being flexed as the outlet valve opens.

3. A gas pump having at the end of its compression cylinder a valve seat, an equilibrium chamber, a plate across the outer end of said chamber and an outer chamber beyond said plate communicating with said equilibrium chamber, combined with an outlet valve adapted to said seat and having a hollow spindle extended through said plate, an inlet pipe connected with said hollow spindle within said outer chamber and thence extending through the wall thereof for connection with a source of gas supply, a pipe extending from said wall and inclosing said inlet pipe for a suitable extent and provided with means for packing the joint between its outer portion and said inlet pipe, and an inlet valve carried by said outlet valve, said inlet pipe being capable of being flexed as the outlet valve opens.

This specification signed and witnessed this 27th day of February, 1907.

RICHARD WHITAKER.

Witnesses:
 LEONARD H. DYER,
 JNO. ROBT. TAYLOR.